No. 760,640. PATENTED MAY 24, 1904.
K. M. MITCHELL.
PLATFORM USED IN CHARGING OR DISCHARGING RETORTS
IN GAS BENCHES.
APPLICATION FILED MAR. 7, 1904.
NO MODEL. 2 SHEETS—SHEET 1.
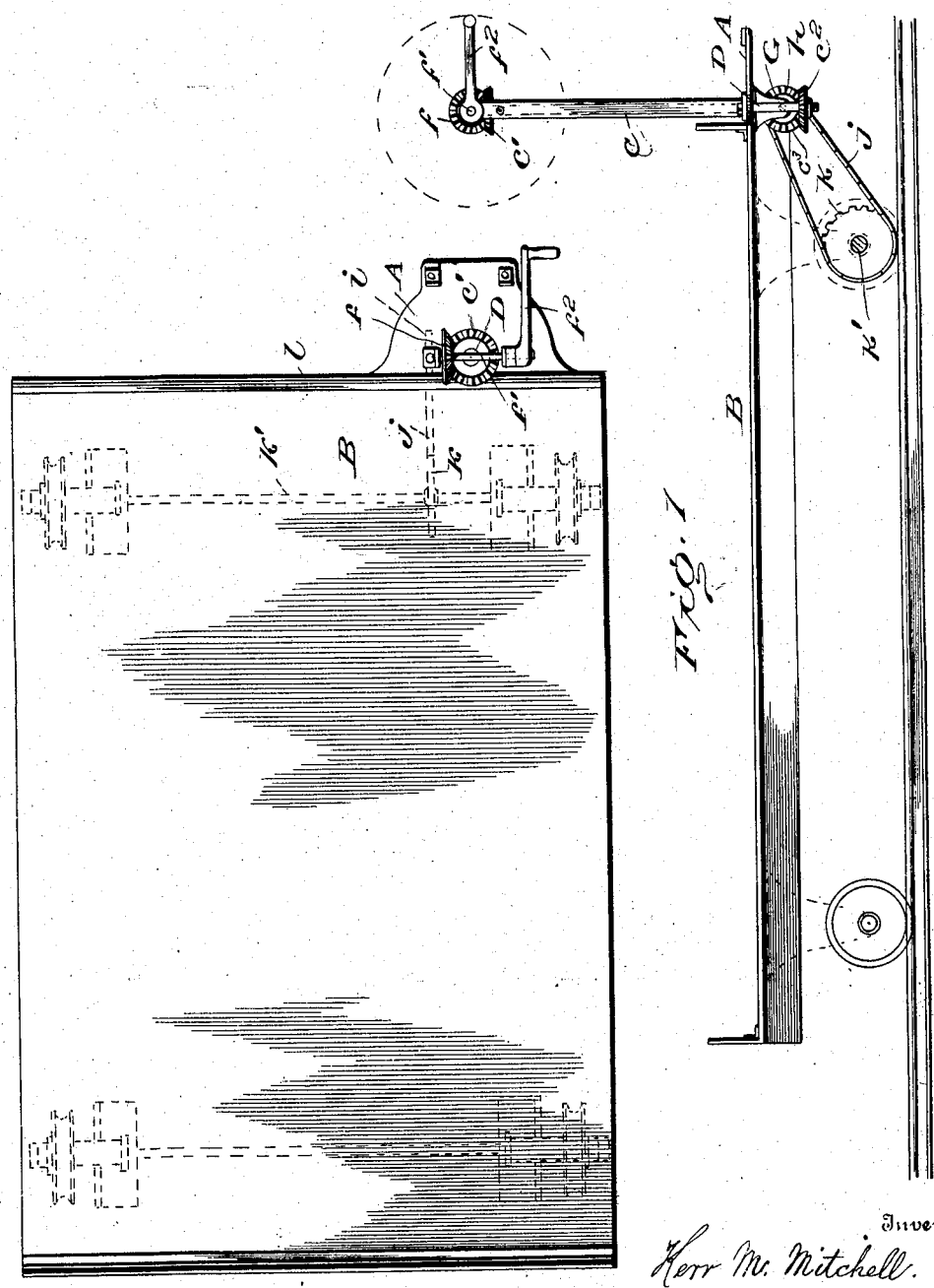

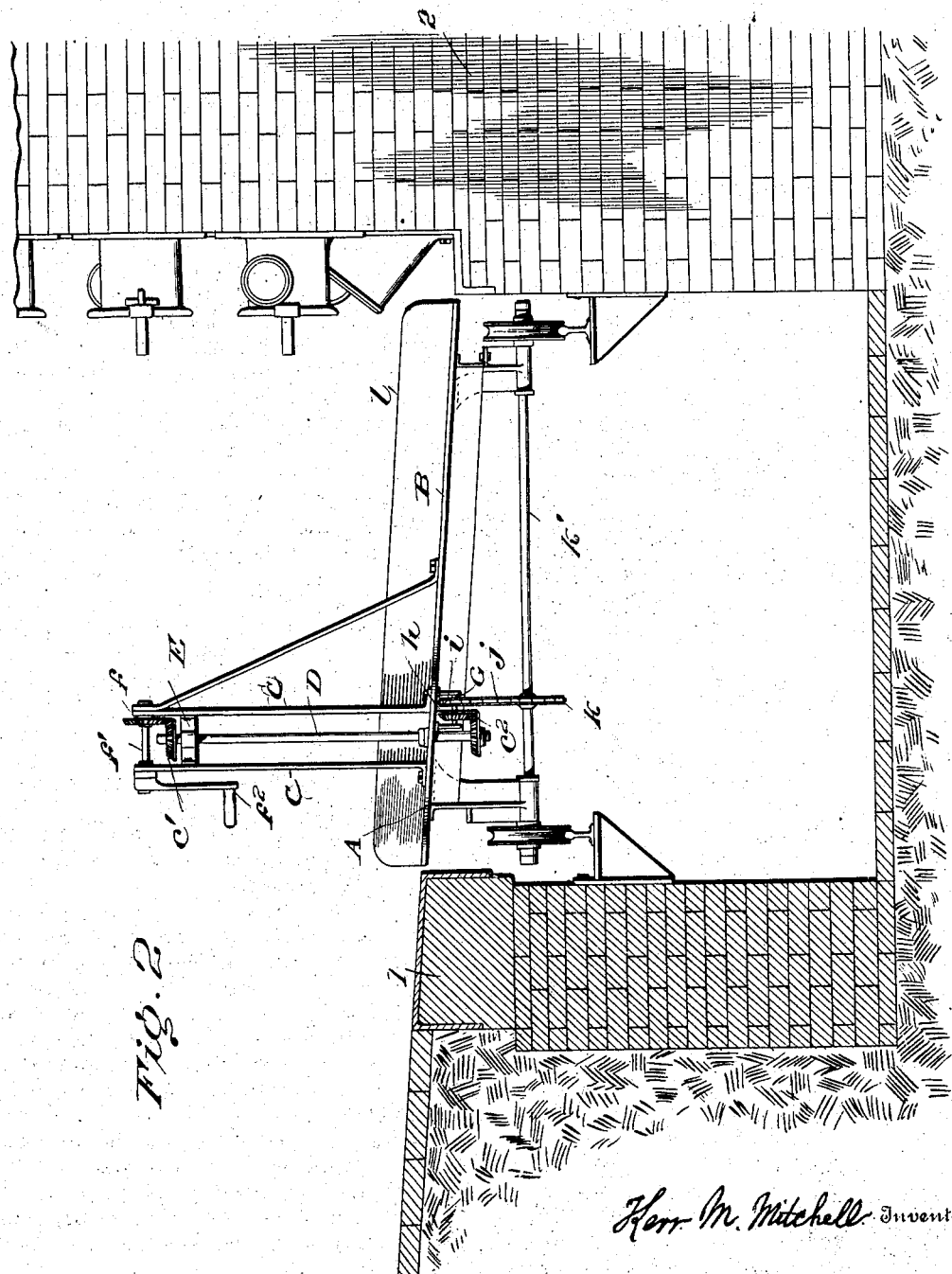

No. 760,640. Patented May 24, 1904.

UNITED STATES PATENT OFFICE.

KERR M. MITCHELL, OF ST. JOSEPH, MISSOURI, ASSIGNOR OF ONE-HALF TO JOHN DELL, OF ST. LOUIS, MISSOURI.

PLATFORM USED IN CHARGING OR DISCHARGING RETORTS IN GAS-BENCHES.

SPECIFICATION forming part of Letters Patent No. 760,640, dated May 24, 1904.

Application filed March 7, 1904. Serial No. 196,914. (No model.)

*To all whom it may concern:*

Be it known that I, KERR MURRAY MITCHELL, a citizen of the United States, residing at St. Joseph, in the county of Buchanan and State of Missouri, have invented new and useful Improvements in Platforms and Appliances to be Used in the Charging or Discharging of Retorts in Gas-Benches, of which the following is a specification.

My invention is for the improvement of a platform and of its appliances to be used in the charging and discharging of the retorts in gas-benches.

In my Patent No. 433,802, dated August 5, 1890, I employ a mere platform or car on wheels, but having no means for moving the platform or car.

My present invention, among other devices, includes special means for easily moving the platform or car by the operator standing on the same either forward or backward to or from the front of one bench of retorts and also whereby when the work of drawing and charging has been completed he may also move the platform to another bed of retorts and without needing, as heretofore, to get down into the pit and push the platform from place to place.

In the drawings, Figure 1 shows a side view of my improved movable platform or car, one of its car-wheels and other parts beneath the platform being removed the better to display the mechanism. Fig. 2 is an end view of the movable platform or car and of its novel features and also shows the pit between any permanent floor 1 and any well-known bench 2 of retorts to be charged or discharged. Fig. 3 is a plan of the platform or car.

A is a cast projection from the car platform or plate B and which serves to support a standard C, firmly secured or braced on the platform-plate B.

D is a shaft extending up through the projection A of the platform and through a proper support E near the top of standard C. This shaft carries a bevel-gear $c'$ on its top and a similar gear $c^2$ on its lower end. The gear $c'$ engages with a bevel-gear $f$ on a crank-shaft $f'$, provided with a crank $f^2$ for operating the mechanism.

Beneath the projection A are supported from it hangers in which is a shaft G, on which are secured a bevel-gear $h$, engaging with gear $c^2$, and also a sprocket-wheel $i$. A sprocket-chain $j$ connects this wheel with a larger sprocket-wheel $k$ on the front axle of $k'$ of the car, as shown.

At both sides of the platform are side boards $l\ l$.

It will be seen that all the mechanism above the car is upon the projection A, thus leaving the whole of the car-floor clear and unobstructed, and that the operator can perform all his duties from the platform, as also the moving of its car from one bench to another and from any position or place to another at will and without his leaving the platform-car or going down into the pit or pushing the car.

What I claim as new in apparatus for charging and discharging of retorts in gas-benches having a pit extending in front of the bench is as follows:

1. In combination with a wheeled platform-car for spanning the pit, a projection from the platform and supporting a stand-shaft, a hand-crank for operating this shaft, gearing engaging said shaft to a sprocket-wheel, and a sprocket-chain from said wheel to a sprocket-wheel secured to a driving-axle of the car.

2. In combination with the platform or car, the standard C thereon, the operating-crank, and its shaft and bevel-gears supported in said standard, the upright shaft D carrying bevel-gears $c'$, $c^2$ at its ends, the bevel-gear $c^3$, engaging with the gear $c^2$, and the sprocket-wheel $i$, sprocket-wheel $k$, and chain $j$, serving to actuate the car-wheel as set forth.

In testimony whereof I have signed my name to this specification in the presence of two subscribing witnesses.

KERR M. MITCHELL.

Witnesses:
FRED HAUENSTEIN,
H. B. LYSAGHT.